(12) United States Patent
Akelbein et al.

(10) Patent No.: US 9,189,625 B2
(45) Date of Patent: Nov. 17, 2015

(54) DATA MANAGEMENT OF POTENTIALLY MALICIOUS CONTENT

(71) Applicant: INTERNATIONAL BUSINESS MACHINES CORPORATION, Armonk, NY (US)

(72) Inventors: Jens-Peter Akelbein, Nackenheim (DE); Mathias Dietz, Mainz (DE); Nils Haustein, Mainz (DE); Rolf Schaefer, Mainz (DE); Ruben Straus, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 14/018,140

(22) Filed: Sep. 4, 2013

(65) Prior Publication Data

US 2014/0101766 A1 Apr. 10, 2014

(30) Foreign Application Priority Data

Oct. 4, 2012 (DE) .................................... 1217732.5

(51) Int. Cl.
*G06F 11/00* (2006.01)
*G06F 21/56* (2013.01)
(52) U.S. Cl.
CPC .............. *G06F 21/56* (2013.01); *G06F 21/564* (2013.01)

(58) Field of Classification Search
CPC ..... G06F 21/121; G06F 21/10; H04L 63/145; H04L 63/14; H04L 63/1416; H04L 63/1425; H04L 63/1433
USPC ........................ 726/22–26; 713/188–189, 193
See application file for complete search history.

(56) References Cited

U.S. PATENT DOCUMENTS

| | | | | |
|---|---|---|---|---|
| 5,956,481 | A * | 9/1999 | Walsh et al. | 726/23 |
| 7,331,061 | B1 * | 2/2008 | Ramsey et al. | 726/23 |
| 7,581,253 | B2 * | 8/2009 | Challener et al. | 726/24 |
| 7,756,834 | B2 | 7/2010 | Masters et al. | |
| 7,814,057 | B2 | 10/2010 | Kathuria et al. | |
| 7,925,888 | B1 * | 4/2011 | Nachenberg | 713/188 |
| 8,370,939 | B2 * | 2/2013 | Zaitsev et al. | 726/23 |
| 2008/0195676 | A1 | 8/2008 | Lyon et al. | |

* cited by examiner

Primary Examiner — Hosuk Song
(74) Attorney, Agent, or Firm — Russell Ng PLLC

(57) ABSTRACT

In a data management system, examination of first data for malicious content by a malicious content scanner is initiated in response to a request to write first data to a data storage device. In response to the examination revealing no malicious content in the first data, the first data, a first signature representative of a version of the malicious content scanner at a time of the examination of the first data, and second data linking the first signature to the first data as read-only data are written to the data storage device.

19 Claims, 2 Drawing Sheets

DATA MANAGEMENT OF POTENTIALLY MALICIOUS CONTENT

BACKGROUND OF THE INVENTION

The present disclosure relates to a data management method, a data management system, and a corresponding computer program product.

It is known to read and write data to storage, for example, using a backup system that preserves historic versions of data in accordance with a backup scheme. For example, such a backup scheme may maintain hourly backups of a file for the last 24 hours, daily backups of the file for the last month, and weekly backups of the file for all previous months. It is, moreover, known to examine data for malicious content to curb spread of computer viruses.

The present disclosure expounds upon this background.

BRIEF SUMMARY

Loosely speaking, the present disclosure teaches a method that coordinates virus prevention techniques and data backup techniques to minimize spread of computer viruses while simultaneously reducing the user encumbrance imposed by anti-virus precautions and infected data.

Inter alia, the present disclosure teaches a data management method that examines a file for malicious content when the file is to be written to storage, for example, when(ever) a user choose to save or save a copy of a file, and that stores a read-only version of the file together with a signature identifying the version of a malicious content scanner used to perform the examination if the examination reveals no malicious content. The present disclosure also teaches a data management method that retrieves a file and an associated malicious content scanner version signature from read-only storage in response to a read instruction and examines the file for malicious content if the signature indicates that the file was previously examined for malicious content using an outdated version of the malicious content scanner.

Since a read-only, virus-free version of the file ("virus-free" not being meant in the absolute sense, but rather relative to the viruses known to the malicious content scanner at the time the file was examined) is stored when(ever) the file is written to storage, the disclosed method ensures that a virus-free backup version of the file will be available should a later instance of that file become infected. Since a malicious content scanner version signature is associated with the stored file, one can easily determine the degree to which the file may need to be reexamined for malicious content when a new instance of the file is created from the stored, read-only version, thus avoiding redundant scans.

Still loosely speaking, the disclosed method may comprise deleting the read-only files as stipulated by a data backup scheme. For example, as touched upon above, such a backup scheme may maintain hourly backups of a file for the last 24 hours, daily backups of the file for the last month, weekly backups of the file for all previous months, and delete all other backups of the file. In this fashion, the disclosed method ensures that sufficiently frequent, virus-free backups of the file are maintained without overtaxing the storage system. Should a backup file later prove to be infected, sequentially older versions of the file can be (automatically) retrieved until an uninfected version is found.

The techniques of the present disclosure may be complementary to "normal" data storage as known in the art.

In one aspect, as touched upon supra, the present disclosure relates to a data management method.

The method may comprise examining (first) data for malicious content. This (first) examining may be carried out by means of a malicious content scanner. The examining may be carried out in response to an instruction to write the (first) data to storage, for example, a user instruction to save or copy a file. As such, the method may comprise receiving (such) a user instruction, for example, via a user input device. Such examining may be carried out in response to every (user) instruction to write data to storage. In other words, the method may comprise subjecting all (user-generated) data to be written to storage to such examining. Similarly, the examining may be carried out at no more often than a given interval, for example, once an hour or once a day, in response to an instruction to write the (first) data to storage, for example, a user instruction to save or copy a file. The given interval may be a user-specified interval. Furthermore, the writing of (user generated) data to storage may be dependent on an outcome of the examining.

The examining may comprise searching the (first) data for any one or more of a plurality of strings/character sequences (so-called "fingerprints") indicative of malicious content. As such, the method may comprise receiving and storing such a plurality of strings/character sequences, for example, in a computer memory. If the examining reveals malicious content in the (first) data, the (first) data may be subjected to processing, for example, as stipulated by an anti-virus policy. For example, the (first) data may be cleansed of the malicious content or the (first) data may be deleted.

The method may comprise writing the (first) data to storage, for example, if the examining reveals no malicious content in the (first) data. Similarly, the method may comprise writing (first) metadata and (second) data linking the metadata to the (first) data to storage, for example, if the examining reveals no malicious content in the (first) data. The (first) metadata may comprise file information such as any (one or more) of a time when the (first) data is written to storage, a data identifier (e.g., a file name) for the (first) data, a size of the (first) data, read and/or write privileges for the (first) data, etc. The data identifier may be specified by the instruction to write the (first) data to storage. The (first) metadata may comprise a (malicious content scanner) signature, for example, a (malicious content scanner) signature may be representative of a version of the malicious content scanner at a time of the examining (of the (first) data for malicious content). As such, the signature may be representative of the plurality of strings/character sequences available to the malicious content scanner at the time of the examining, that is, representative of the set of "fingerprints" of malicious content known to/stored by the malicious content scanner at the time of the examining.

In the present disclosure, the conditional expression "if" may be understood in the sense of "subject to the condition that," that is, in the sense of "if and only if."

Any (one or more or each) of the (first) data, the signature and the (second) data may be written to storage as a read-only data, for example, as data written to a read-only medium or as data identified in a file system of the storage as being read-only for all users, for all users without administrator or root privileges or for all users without root privileges.

Any storing of data/information as well as any writing of data/information to storage described in the present disclosure may be effected by a data storage system, for example, a data storage system that operates in accordance with a data storage scheme. The data storage scheme may stipulate a scheme for data distribution and/or redundancy among a plurality of storage media (e.g., a RAID scheme) and/or a backup scheme for retaining/deleting (backup copies of) data over time. Data storage system may comprise one or more storage devices, e.g. hard disks, tape drives, solid state storage, etc.

In lieu of or in addition to any of the (related/corresponding) actions described in the present disclosure, the method may comprise one or more control actions. In this respect, the method may comprise instigating a malicious content scanner to examine the (first) data for malicious content. Similarly, the method may comprise instigating a data storage system to write the (first) data to storage as described above, for example, together with a (malicious content scanner) signature and (second) data linking the signature to the (first) data and/or as read-only data. Such instigating may be effected by a controller and may comprise sending an examine instruction (from the controller) to the malicious content scanner and/or a write instruction (from the controller) to the data storage system. The examine instruction may comprise the (first) data, a link to the (first) data or other information that allows the malicious content scanner to obtain the (first) data. Similarly, the write instruction may comprise the (first) data, a link to the (first) data or other information that allows the data storage system to obtain the (first) data. Furthermore, the method may comprise receiving (at the controller) a result of the examining (of the (first) data for malicious content), for example, from the malicious content scanner. Similarly, the method may comprise receiving (at the controller) a signature of the malicious content scanner at the time of the examining. The write instruction may comprise the signature, a link to the signature or other information that allows the data storage system to obtain the signature. The method may moreover comprise receiving a (user) instruction to write (the first) data to storage.

The method may comprise storing, for example, if the examining reveals malicious content in the (first) data, information relating to the (first) data and/or to the (write) instruction, which information may be useful for determining a source of the malicious content and/or for preventing further spreading of the malicious content. In this respect, method may comprise storing at least one of a time of (receipt of) the instruction, a user associated with the instruction (e.g., a user from whom the instruction originated), a computer associated with the instruction (e.g., a computer from which the instruction originated or via which the instruction was received), a source of the instruction (e.g., an application or device from which the instruction originated), a file type of the (first) data, a user associated with the (first) data (e.g., a user who modified the data and/or who initially created the data), a computer associated with the (first) data (e.g., a computer from which the data originated or via which the data was received) and a source of the (first) data (e.g., an application or device from which the data originated). The method may comprise writing such information to storage as read-only data, for example, as data written to a read-only medium or as data identified in a file system of the storage as being read-only for all users, for all users without administrator or root privileges or for all users without root privileges. The actions associated with such storage of information may be coordinated and/or instigated by the controller.

The method may comprise retrieving (second) data from (read-only) storage. Similarly, the method may comprise retrieving (second) data and a (second) signature, for example, a (malicious content scanner version) signature, linked to the (second) data from (read-only) storage. The retrieving may be effected if the examining reveals malicious content in the (first) data. The (second) data may be the youngest (available) data identified by the data identifier (of the write instruction), e.g. the youngest (available) data having a storage date predating the instruction to write the (first) data to storage. The method may comprise informing a user of the malicious content in the (first) data and offering the retrieved (second) data to the user if the examining reveals malicious content in the (first) data.

The method may comprise performing statistical analysis of the information. The statistical analysis may comprise determining whether a frequency with which write and/or read instructions from a given user and/or computer result in a revealing of malicious content exceeds a given threshold. The method may comprise communicating a warning to a user if a result of the statistical analysis falls within a range indicative of an infection with malicious content. For example, a system administrator can be advised if more than 5% of the files read and written by a particular user are determined to contain malicious content. Such statistical analysis may be effected by the controller.

The method may comprise deleting the read-only (first) data, for example, at a time stipulated by backup scheme (of the data storage system). For example, the data storage system may comprise a process with administrator or root privileges that prunes out unnecessarily frequent backups as they age as stipulated by the backup scheme. For example, as touched upon above, such a backup scheme may maintain hourly backups of a file for the last 24 hours, daily backups of the file for the last month, weekly backups of the file for all previous months, and delete all other backups of the file. For the sake of data security, such a process may be carefully programmed to reduce the likelihood of the process's privileges being maliciously exploited.

The method may comprise retrieving data, for example, the aforementioned (first) data, from (read-only) storage. Similarly, the method may comprise retrieving (the first) data and a (first) signature, for example, the aforementioned (malicious content scanner version) signature, linked to the (first) data from (read-only) storage. The retrieved data may be a youngest version of the data (stored in the data storage system). The retrieving of data may be effected in response to a (user) instruction to read (first) data identified by a data identifier from storage. As such, the method may comprise receiving (such) a user instruction, for example, via a user input device. The retrieved data may be data identified by the data identifier. The data identifier may comprise a unique file ID, a file name, a pointer to a file and/or other information that allows data in storage to be (readily and/or uniquely) identified. As touched upon above, the read-only storage need not be a read-only medium. Instead, storage of the data may be read-only in the sense that the user/system retrieving the data or requesting retrieval of the data does not have the privileges necessary to alter or delete the data.

The method may comprise determining a current version signature of a malicious content scanner, that is, a signature of a malicious content scanner in its current version. As touched upon above, the signature may be representative of the plurality of strings/character sequences currently available to the malicious content scanner, that is, representative of the set of "fingerprints" of malicious content currently known to/stored by the malicious content scanner.

The method may comprise examining the (retrieved/first) data for malicious content, for example, if the (retrieved/first) malicious content scanner version signature does not match the current version signature, for example, if the current version signature indicates that the current malicious content scanner includes "fingerprints" of malicious content not known to the malicious content scanner at the time the (retrieved/first) data was examined for malicious content before being written to (read-only) storage. This (second) examining may be carried out by means of the current malicious content scanner.

The method may comprise storing, for example, if the (second) examining reveals malicious content in the (retrieved/first) data, information relating to the (retrieved/first) data and/or to the (read) instruction, which information may be useful for determining a source of the malicious content and/or for preventing further spreading of the malicious content as described above.

The method may comprise retrieving (second) data from (read-only) storage. Similarly, the method may comprise retrieving (second) data and a (second) signature, for example, a (malicious content scanner version) signature, linked to the (second) data from (read-only) storage. The retrieving may be effected if the (second) examining reveals malicious content in the (retrieved/first) data. The (second) data may be the youngest (available) data identified by the data identifier (of the read instruction) and having a storage date predating a(n earliest) storage date of the (retrieved/first) data.

As touched upon above, the method may comprise retrieving (second) data from (read-only) storage, the (second) data being the youngest (available) data identified by the data identifier (of the (write) instruction to write (first) data to storage) and having a storage date predating the write instruction. Similarly, the method may comprise retrieving (second) data from (read-only) storage, the (second) data being the youngest (available) data identified by the data identifier (of the (read) instruction to read (first) data from storage) and having a storage date predating a(n earliest) storage date of the (first) data. As such, since the storage date of the retrieved (second) data will typically predate the read instruction, the (second) data may be summarily defined as youngest data identified by the data identifier and having a storage date predating an elder of a storage date of the first data and the (read/write) instruction (request).

For example, the method may comprise retrieving the next oldest version of a file identified by the data identifier relative to a version of the file revealed (by the second examining) to contain malicious content. The youngest (available) data identified by the data identifier (of the read instruction) having a storage date predating a(n earliest) storage date of the (retrieved/first) data may be determined using metadata linked to the respective data, that is, using metadata linked to the (retrieved/first) data and/or metadata linked to the youngest (available) data.

The method may comprise examining the (second) data for malicious content, for example, if the (retrieved/second) signature does not match the current version signature, for example if the current version signature indicates that the current malicious content scanner includes "fingerprints" of malicious content not known to the malicious content scanner at the time the (retrieved/second) data was examined for malicious content before being written to (read-only) storage. This (third) examining may be carried out by means of the current malicious content scanner.

The method may comprise examining (third) data for malicious content, for example, as described above. This (fourth) examining may be carried out by means of a malicious content scanner. The (fourth) examining may be carried out in response to an instruction to write the (third) data to storage, for example, a user instruction to save or copy a file. As such, the method may comprise receiving (such) a user instruction, for example, via a user input device. As touched upon above, examining may be carried out in response to every (user) instruction to write data to storage. In other words, the method may comprise subjecting all (user generated) data to be written to storage to such examining. Furthermore, the writing of (user generated) data to storage may be dependent on an outcome of the examining.

The method may comprise writing the (third) data to storage, for example, if the (fourth) examining reveals no malicious content in the (third) data. Similarly, the method may comprise writing (second) metadata and (fourth) data linking the (second) metadata to the (fourth) data to storage, for example, if the (fourth) examining reveals no malicious content in the (third) data. The (second) metadata may comprise file information such as any (one or more) of a time when the (fourth) data is written to storage, a size of the (fourth) data, read and/or write privileges for the (fourth) data, etc. The metadata may comprise a (malicious content scanner) signature, for example, a (malicious content scanner) signature may be representative of a version of the malicious content scanner at a time of the (fourth) examining (of the (third) data for malicious content).

The method may comprise deleting (retrieved) data from (read-only) storage if an examining of the (retrieved) data reveals malicious content. For example, the method may comprise deleting the first data from (read-only) storage if the second examining of the first data reveals malicious content.

As touched upon supra, the method may comprise one or more control actions in lieu of or in addition to any of the (related/corresponding) actions described in the present disclosure. In this respect, the method may comprise instigating a data storage system to retrieve data identified by a data identifier from (read-only) storage, for example, together with a (malicious content scanner) signature and (second) data linking the signature to the (retrieved) data. Similarly, the method may comprise instigating a malicious content scanner to examine the (retrieved) data for malicious content. Such instigating may be effected by a controller and may comprise sending a read instruction (from the controller) to the data storage system and/or an examine instruction (from the controller) to the malicious content scanner. The read instruction may comprise the data identifier and may comprise a storage date of retrieved data revealed to contain malicious content. Similarly, the examine instruction may comprise the (retrieved) data, a link to the (retrieved) data or other information that allows the malicious content scanner to obtain the (retrieved) data. Furthermore, the method may comprise receiving (at the controller) a result of the examining (of the (retrieved) data for malicious content), for example, from the malicious content scanner. The method may comprise determining whether a (retrieved) malicious content scanner version signature matches a current version signature. Such determining may be effected by the controller, by the malicious content scanner or by the controller in cooperation with the malicious content scanner. The method may moreover comprise receiving a (user) instruction to retrieve (the first) data to storage.

While the teachings of the present disclosure have been discussed hereinabove mainly in the form of a method, the teachings may be embodied, mutatis mutandis, in the form of a system, for example, a data management system, or a computer program product, as will be appreciated by the person skilled in the art.

The system may comprise a controller. Furthermore, the system may comprise a data storage system and may comprise a malicious content scanner.

As touched upon above, the method may be effected by the controller, for example, a controller that coordinates interaction between the malicious content scanner and the data storage system or a controller that coordinates interaction between the malicious content scanner, the data storage system and a computer operating system. The system may be configured and adapted to effect any of the actions described above with respect to the disclosed method. Similarly, the system may comprise a control component that effects, coordinates and/or instigates any of the actions described above with respect to the disclosed method.

The system may comprise a user input device that receives a user input as discussed hereinabove.

Any of the aforementioned components of the system may communicate with any other of the aforementioned components of the system. In this respect, the system may comprise one or more communication buses/links interconnecting the respective components.

DETAILED DESCRIPTION

Figure 1:
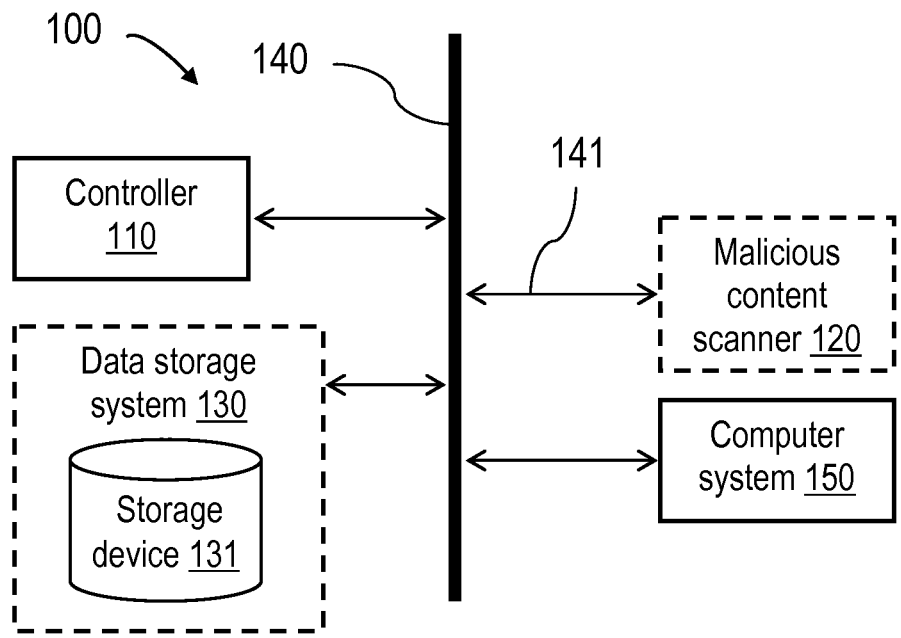
FIG. 1 schematically shows an embodiment of a data management system in accordance with the present disclosure.

FIG. 1 schematically shows an embodiment of a data management system 100 in accordance with the present disclosure, for example, as described above.

In the illustrated embodiment, data management system 100 comprises a controller 110, an optional malicious content scanner 120, an optional data storage system 130, as well as a communication bus 140 comprising a plurality of communication links 141 (for the sake of legibility, only one of the communication links bears a reference sign). Data storage system 130 comprises a storage device 131, for example, a hard disk. Communication bus 140 and the communication links 141 communicatively interconnect the aforementioned components 110-130 and an end-user computer system 150.

Figure 2:
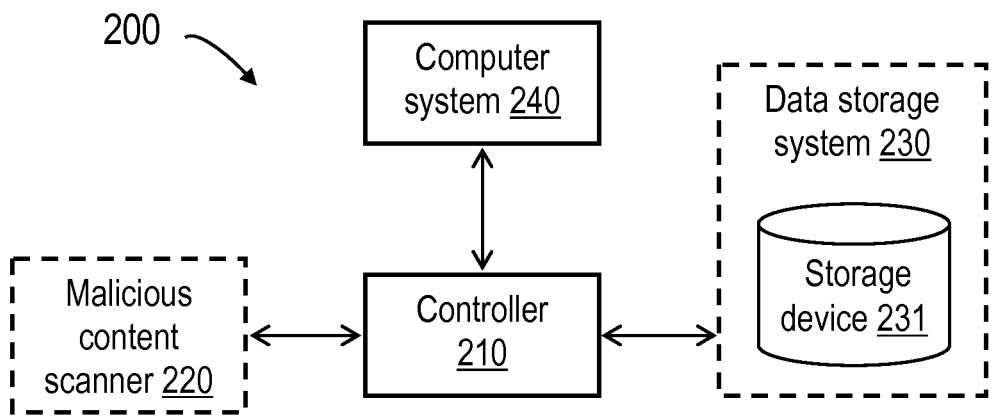
FIG. 2 schematically shows another embodiment of a data management system in accordance with the present disclosure.

FIG. 2 schematically shows an embodiment of a data management system 200 in accordance with the present disclosure, for example, as described above.

In the illustrated embodiment, data management system 200 comprises a controller 210, an optional malicious content scanner 220, and an optional data storage system 230 comprising a storage device 231. Controller 210 is in bidirectional communication with malicious content scanner 220 and data storage system 230, as well as with an end-user computer system 240.

Operation of data management system 200 may be carried out as follows.

When a user of end-user computer system 240 indicates a desire to save a file, a write instruction (request) identifying the file is communicated from end-user computer system 240 to controller 210. Controller 210 instigates malicious content scanner 220 examining the file for malicious content and receives a result of the examining from malicious content scanner 220. If the result of the examining reveals no malicious content in the file, controller 210 instigates data storage system 230 writing a read-only version of the file to storage, for example, to storage device 231. The file may be written to storage together with metadata comprising the signature of malicious content scanner 220 that was valid at the time the file was examined.

When the user of end-user computer system 240 indicates a desire to retrieve a file identifiable by a particular file identifier, for example, a filename or a file ID, a read instruction (request) identifying the file is communicated from end-user computer system 240 to controller 210. Controller 210 instigates data storage system 230 retrieving (a most recent version) of the file identified by the file identifier. Data storage system 230 retrieves the file identified by the file identifier together with a malicious content scanner version signature linked to the file. Controller 210 obtains a current version signature of the malicious content scanner and compares it with the malicious content scanner version signature retrieved with the file. If the two signatures match, controller 210 passes the file on to end-user computer system 240. If the two signatures do not match, controller 210 instigates malicious content scanner 220 (re)examining the retrieved file for malicious content using the current, updated signature. If malicious content scanner 220 returns a result indicating that the retrieved file does not contain malicious content, controller 210 passes the file on to end-user computer system 240. If malicious content scanner 220 returns a result indicating that the retrieved file does contain malicious content, controller 210 instigates data storage system 230 retrieving the next youngest version of the file identified by the file identifier and instigates malicious content scanner 220 examining the retrieved (next youngest) file for malicious content. If malicious content scanner 220 returns a result indicating that the retrieved file does not contain malicious content, the file is passed on to end-user computer system 240. Otherwise, the process of retrieving and examining sequentially older versions of the file is reiterated until all versions of the file have been exhausted or a version without malicious content is found.

Once malicious content scanner 220 has returned a result indicating that a retrieved file contains malicious content, controller 210 may presume that older versions of that file have not been examined using the most recent version of malicious content scanner 220. Accordingly, controller 210 may refrain from instigating data storage system 230 to retrieve a malicious content scanner version signature when instigating retrieval of earlier versions of that file. Similarly, controller 210 may subject all earlier versions of that file to an examination for malicious content, that is, without comparing a signature linked to that file to the current version signature of malicious content scanner 220.

Figure 3:
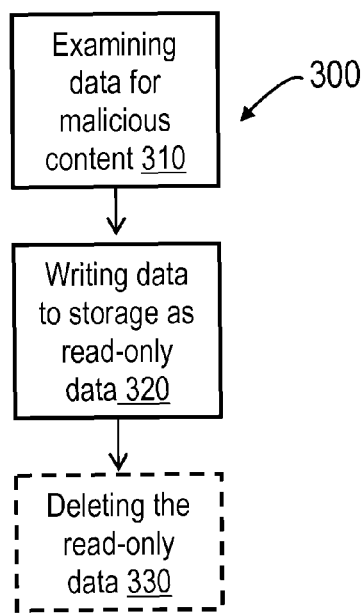
FIG. 3 schematically shows a flow diagram of an embodiment of a data management method in accordance with the present disclosure.

FIG. 3 schematically shows a flow diagram 300 of an embodiment of a data selection method in accordance with the present disclosure, for example, as described above.

In the illustrated embodiment, flow diagram 300 comprises a step 310 of examining data for malicious content, a step 320 of writing data to storage as read-only data, and an optional step 330 of deleting the read-only data at a time stipulated by a backup scheme.

Figure 4:
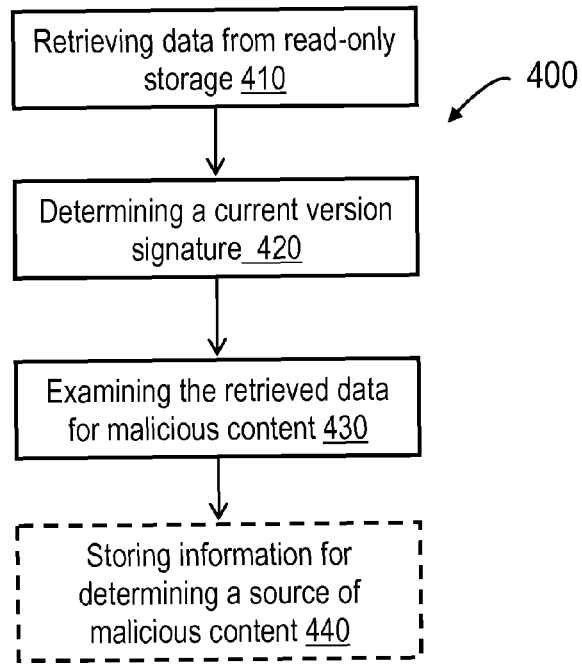
FIG. 4 schematically shows a flow diagram of another embodiment of a data management method in accordance with the present disclosure.

FIG. 4 schematically shows a flow diagram 400 of another embodiment of a data selection method in accordance with the present disclosure, for example, as described above.

In the illustrated embodiment, flow diagram 400 comprises a step 410 of retrieving data from read-only storage, a step 420 of determining a current version signature, a step 430 of examining the retrieved data for malicious content, and an optional step 440 of storing information for determining a source of malicious content.

Figure 5:
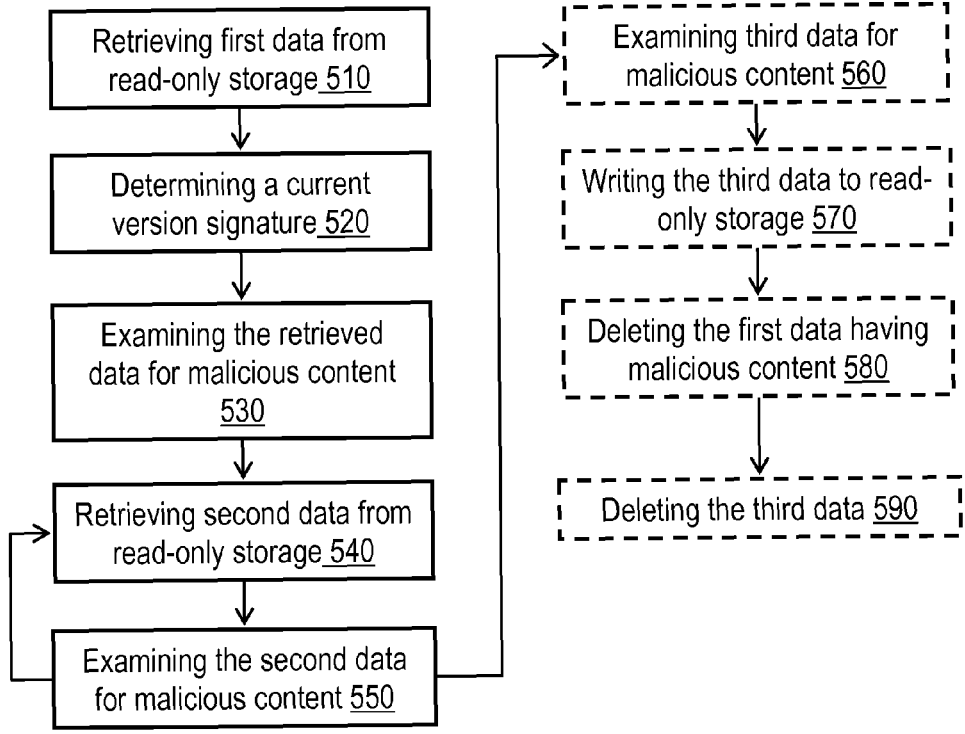
FIG. 5 schematically shows a flow diagram of another embodiment of a data management method in accordance with the present disclosure.

FIG. 5 schematically shows a flow diagram 500 of another embodiment of a data selection method in accordance with the present disclosure, e.g. as described above.

In the illustrated embodiment, flow diagram 500 comprises a step 510 of retrieving first data from read-only storage, a step 520 of determining a current version signature, a step 530 of examining the retrieved data for malicious content, an optional step 540 of retrieving second data from read-only storage, an optional step 550 of examining the second data for malicious content, an optional step 560 of examining third data for malicious content, an optional step 570 of writing the third data to read-only storage, an optional step 580 of deleting the first data having malicious content from the read-only storage, and an optional step 590 of deleting the third data at a time stipulated by backup scheme. As shown by the arrow, the method can flow from step 550 back to step 540, for example, if the data retrieved at step 540 is determined at step 550 to contain malicious content.

As will be appreciated by one skilled in the art, aspects of the present disclosure may be embodied as a system, method or computer program product. Accordingly, aspects of the present disclosure may take the form of an entirely hardware embodiment, an embodiment including software (including firmware, resident software, micro-code, etc.), or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardwarebased systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the present disclosure, the verb "may" is used to designate optionality/noncompulsoriness. In other words, something that "may" can, but need not.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A data management method, comprising:
   in response to a request to write first data to a data storage device, initiating examination of the first data for malicious content by a malicious content scanner;
   in response to the examination revealing no malicious content in the first data, writing to the data storage device, as read-only data, the first data, a first signature representative of a version of the malicious content scanner at examination of the first data, and second data linking the first signature to the first data;
   in response to a request to read the first data from the data storage device, retrieving the first data and the first signature from read-only storage in the data storage device;
   determining a current version of the signature of the malicious content scanner at the retrieving; and
   initiating examination of the first data for malicious content by the malicious content scanner in response to the current version of the signature not matching the retrieved first signature.

2. The method of claim 1, and further comprising:
   in response to examination of the first data revealing malicious content, retrieving from read-only storage second data and a second signature of the malicious content scanner linked to the second data, the second data being youngest data identified by a data identifier shared in common with the first data and having a storage date predating an earliest of a storage date of the first data and the request; and
   initiating examination of the second data for malicious content by the malicious content scanner in response to the second signature not matching the current version of the signature.

3. The method of claim 1, and further comprising:
   in response to a request to write third data identified by the data identifier to the data storage device, initiating examination of the third data for malicious content by the malicious content scanner, and
   in response to examination of the third data revealing no malicious content in the third data, writing to the data storage device as read-only data:
   the third data,
   the data identifier,
   a third signature representative of a version of the malicious content scanner at examination of the third data, and
   fourth data linking the third signature and the data identifier to the third data.

4. The method of claim 1, and further comprising:
   deleting the first data from the read-only storage in response to examination of the first data revealing malicious content in the first data.

5. The method of claim 1, and further comprising deleting the read-only data at a time stipulated by a backup scheme.

6. The method of claim 1, and further comprising:
   in response to examination of the first data revealing malicious content, storing at least one of a set including a time of the request, a user associated with the request, a computer associated with the request, a source of the request, a file type of the first data, a user associated with the first data, a computer associated with the first data, and a source of the first data.

7. An apparatus for data management system including a data storage device and a malicious content scanner, wherein the apparatus comprises:
   a controller that, responsive to a request to write first data to a data storage device, initiates examination of the first data for malicious content by a malicious content scanner, wherein the controller, responsive to the examination revealing no malicious content in the first data, writes to the data storage device, as read-only data, the first data, a first signature representative of a version of the malicious content scanner at examination of the first data, and second data linking the first signature to the first data;
   wherein the controller, responsive to a request to read the first data from the data storage device, retrieves the first data and the first signature from read-only storage in the data storage device, determines a current version of the signature of the malicious content scanner at the retrieving, and initiates examination of the first data for malicious content by the malicious content scanner in response to the current version of the signature not matching the retrieved first signature.

8. The apparatus of claim 7, wherein:
   the controller, responsive to examination of the first data revealing malicious content, retrieves from read-only storage second data and a second signature of the malicious content scanner linked to the second data, the second data being youngest data identified by a data identifier shared in common with the first data and having a storage date predating an earliest of a storage date of the first data and the request; and
   the controller initiates examination of the second data for malicious content by the malicious content scanner in response to the second signature not matching the current version of the signature.

9. The apparatus of claim 7, wherein:
   the controller, responsive to a request to write third data identified by the data identifier to the data storage device, initiates examination of the third data for malicious content by the malicious content scanner, and the controller, responsive to examination of the third data revealing no malicious content in the third data, writes to the data storage device as read-only data:

the third data, the data identifier, a third signature representative of a version of the malicious content scanner at examination of the third data, and fourth data linking the third signature and the data identifier to the third data.

10. The apparatus of claim 7, wherein:

the controller deletes the first data from the read-only storage in response to examination of the first data revealing malicious content in the first data.

11. The apparatus of claim 7, wherein the controller deletes the read-only data at a time stipulated by a backup scheme.

12. The apparatus of claim 7, wherein:

the controller, responsive to examination of the first data revealing malicious content, stores at least one of a set including a time of the request, a user associated with the request, a computer associated with the request, a source of the request, a file type of the first data, a user associated with the first data, a computer associated with the first data, and a source of the first data.

13. The apparatus of claim 7, and further comprising the data storage device and the malicious content scanner.

14. A program product, comprising:

a computer-readable storage device; and program code stored on the computer-readable storage device that, when executed, causes a data management system to perform:

in response to a request to write first data to a data storage device, initiating examination of the first data for malicious content by a malicious content scanner;

in response to the examination revealing no malicious content in the first data, writing to the data storage device, as read-only data, the first data, a first signature representative of a version of the malicious content scanner at examination of the first data, and second data linking the first signature to the first data;

in response to a request to read the first data from the data storage device, retrieving the first data and the first signature from read-only storage in the data storage device;

determining a current version of the signature of the malicious content scanner at the retrieving; and initiating examination of the first data for malicious content by the malicious content scanner in response to the current version of the signature not matching the retrieved first signature.

15. The program product of claim 14, wherein the program code further causes the data management system to perform:

in response to examination of the first data revealing malicious content, retrieving from read-only storage second data and a second signature of the malicious content scanner linked to the second data, the second data being youngest data identified by a data identifier shared in common with the first data and having a storage date predating an earliest of a storage date of the first data and the request; and initiating examination of the second data for malicious content by the malicious content scanner in response to the second signature not matching the current version of the signature.

16. The program product of claim 14, wherein the program code further causes the data management system to perform:

in response to a request to write third data identified by the data identifier to the data storage device, initiating examination of the third data for malicious content by the malicious content scanner, and in response to examination of the third data revealing no malicious content in the third data, writing to the data storage device as read-only data:

the third data, the data identifier, a third signature representative of a version of the malicious content scanner at examination of the third data, and fourth data linking the third signature and the data identifier to the third data.

17. The program product of claim 14, wherein the program code further causes the data management system to perform:

deleting the first data from the read-only storage in response to examination of the first data revealing malicious content in the first data.

18. The program product of claim 14, wherein the program code further causes the data management system to perform:

deleting the read-only data at a time stipulated by a backup scheme.

19. The program product of claim 14, wherein the program code further causes the data management system to perform:

in response to examination of the first data revealing malicious content, storing at least one of a set including a time of the request, a user associated with the request, a computer associated with the request, a source of the request, a file type of the first data, a user associated with the first data, a computer associated with the first data, and a source of the first data.

* * * * *